United States Patent [19]

Chang et al.

[11] Patent Number: 5,362,581
[45] Date of Patent: * Nov. 8, 1994

[54] BATTERY SEPARATOR

[75] Inventors: Victor S. Chang, Ellicott City; Richard C. Hartwig, Laurel, both of Md.; Joseph T. Lundquist, Gilroy, Calif.; Marc E. Parham, Bedford; Anthony J. Laccetti, North Andover, both of Mass.

[73] Assignee: W. R. Grace & Co.-Conn., New York, N.Y.

[ * ] Notice: The portion of the term of this patent subsequent to Sep. 13, 2011 has been disclaimed.

[21] Appl. No.: 41,085

[22] Filed: Apr. 1, 1993

[51] Int. Cl.$^5$ .............................. H01M 2/14
[52] U.S. Cl. ................... 429/249; 429/129; 429/131; 429/142; 429/145; 429/251; 429/254
[58] Field of Search ............... 429/129, 131, 142, 145, 429/249, 251, 254

[56] References Cited

U.S. PATENT DOCUMENTS

| | | |
|---|---|---|
| 2,953,622 | 9/1960 | Gray . |
| 3,036,143 | 5/1962 | Fisher et al. . |
| 3,351,495 | 11/1967 | Larsen et al. . |
| 3,419,430 | 12/1968 | Michaels . |
| 3,419,431 | 12/1968 | Michaels . |
| 3,450,650 | 6/1969 | Murata . |
| 3,632,404 | 1/1972 | Dessuminiers et al. . |
| 3,651,030 | 3/1972 | Desumminiers et al. . |
| 3,696,061 | 10/1972 | Selsor et al. . |
| 3,709,841 | 1/1973 | Quentin . |
| 3,749,604 | 7/1973 | Langer et al. . |
| 3,766,106 | 10/1973 | Yurimota et al. . |
| 3,853,601 | 12/1974 | Taskier . |
| 3,855,122 | 12/1974 | Bourganel . |
| 3,900,341 | 8/1975 | Schoichiro et al. . |
| 3,933,561 | 1/1976 | Larson et al. . |
| 4,008,203 | 2/1977 | Jones et al. . |
| 4,024,323 | 5/1977 | Versteegh . |
| 4,072,802 | 2/1978 | Marata et al. . |
| 4,098,930 | 7/1978 | Nakayama et al. . |
| 4,137,379 | 1/1979 | Schmidt et al. ............ 429/254 |
| 4,153,760 | 5/1979 | Sundberg et al. . |
| 4,201,838 | 5/1980 | Goldberg . |
| 4,210,998 | 7/1980 | Gaunt . |
| 4,221,846 | 9/1980 | Armstrong et al. . |
| 4,243,562 | 1/1981 | Petit . |
| 4,251,605 | 2/1981 | Inone et al. . |
| 4,273,903 | 6/1991 | Rose . |
| 4,286,015 | 8/1981 | Yoshida et al. . |
| 4,287,276 | 9/1981 | Lundquist et al. . |
| 4,351,860 | 9/1982 | Yoshida et al. . |
| 4,481,260 | 11/1984 | Nohmi . |
| 4,529,646 | 7/1985 | Sundet . |
| 4,650,730 | 3/1987 | Lundquist et al. ............ 429/62 |
| 4,650,730 | 3/1987 | Lundquist et al. . |
| 4,681,750 | 7/1987 | Johnson et al. . |
| 4,699,857 | 10/1987 | Giovannoni et al. . |
| 4,714,663 | 12/1987 | Arnold et al. . |
| 4,721,568 | 1/1988 | Henrious . |
| 4,731,304 | 3/1988 | Lundquist et al. . |
| 4,755,299 | 7/1988 | Brüschke . |
| 4,776,999 | 10/1988 | Kohn . |

Primary Examiner—Prince Willis, Jr.
Assistant Examiner—M. Nuzzolillo
Attorney, Agent, or Firm—Howard J. Troffkin

[57] ABSTRACT

A battery separator composed of a microporous sheet product having first and second major surfaces and a thickness of less than about 50 mils, formed from a uniform mixture of a polycarbonate polymer and a filler or a polycarbonate and a structure enhancing agent, said sheet product having a porous sheet embedded within said mixture and between the first and second major surfaces. The porosity of the sheet product is at least about 50 volume percent composed of pores such that the nominal pore diameter increases incrementally from each major surface towards the interior central portion of the sheet product's thickness.

16 Claims, No Drawings

BATTERY SEPARATOR

BACKGROUND OF THE INVENTION

The subject invention is directed to a sheet product which is useful as separator components for acid batteries and to improved batteries containing the formed separator. More specifically, the present invention is directed to a thin microporous sheet product composed of a highly filled polymeric matrix or a low-level filled (including unfilled) polymer matrix having a porous sheet support embedded between the sheet product's first and second major surfaces and having an average pore size distribution across the thickness of the sheet product such that there is a gradient of nominal pore size increasing from each major surface towards the interior central portion of the sheet product's thickness.

Membranes have been formed from various materials and used in various applications such as in ion exchange, osmotic and ultra filtration devices including desalinazation, kidney dialysis, gas separation and other applications. Macro and microporous membranes have been used as a means of insulating and separating electrodes in battery devices. Each application provides an environment and a set of desired parameters which are distinct to the specific application.

Storage batteries have at least one pair of electrodes of opposite polarity and, in general, have series of adjacent electrodes of alternating polarity. The current flow between these electrodes is maintained by an electrolyte which may be acidic, alkaline, or substantially neutral depending upon the nature of the battery system. The present sheet product is particularly useful in storage batteries having acidic electrolyte. Separators are located in batteries between adjacent electrodes of opposite polarity to prevent direct contact between the oppositely charged electrode plates while freely permitting electrolytic conduction. Separator components have taken many forms. In a modern battery design, the separator is in the form of a thin sheet or film or more preferably, a thin envelope surrounding each electrode plate of one polarity.

It is generally agreed that one of the critical elements in a battery design is the separator component and, to be highly effective in the design, the separator should have a combination of features. The battery separator must be resistant to degradation and instability with respect to the battery environment, including the other battery components and the battery chemistry. Thus, the battery separator must be capable of withstanding degradation of strong acids (such as sulfuric acid commonly used in acid battery designs) and to do so under ambient and elevated temperature conditions. Further, the separator should also be of a thin and highly porous character to provide a battery of high energy density. Although battery separators of thick or heavy design have been utilized in the past, such materials detract from the overall energy density of the battery by reducing the amount of electrodes that can be contained in a predetermined battery configuration and size. Another criteria is that the battery separator must be capable of allowing a high degree of electrolytic conductivity. Stated another way an effective separator membrane must exhibit a low electrical resistance when in the battery. The lower the electrical resistance the better the overall battery performance will be. A still further criteria is that the separator should be capable of inhibiting formation and growth of dendrites. Such dendrite formation occurs during battery operation when part of the electrode material becomes dissolved in the electrolyte and, while passing through the separator, deposits therein to develop a formation which can, after a period of time, bridge the thickness of the separator membrane and cause shorting between electrodes of opposite polarity.

In addition to meeting the above combination of properties, it is highly desired to have a sheet product which is capable of exhibiting good physical properties of tensile strength, flexibility and ductility to withstand the handling and processing without developing imperfections and cracks which would cause the sheet product to be unsuitable as a battery separator. Meeting this criteria is contrary to some of the above described properties (i.e. thin and light weight material and high porosity to provide good conductivity). In providing envelope type separators, these physical properties must also be accompanied by the ability of the material to be sealable by heat, or other means to provide a pocket design. As part of the physical property requirements, the sheet product should be capable of exhibiting a high degree of integrity during formation and use.

Various microporous membranes or sheet materials have been suggested for utilization as a battery separator. Separators conventionally used in present battery systems are formed of polymeric films which when placed in an electrolyte or an electrolyte system, are capable of exhibiting a high degree of conductivity while being stable to the environment presented by the battery system. The films include macroporous as well as microporous materials. The porosity permits transportation of the electrolyte. Examples of such separators include unfilled polyolefin sheets which have been stretched and annealed to provide microporosity to the sheet, such as is described in U.S. Pat. Nos. 3,558,764; 3,679,538; and 3,853,601. In addition, polyolefin separators which include filler materials are disclosed in U.S. Pat. Nos. 3,351,495 and 4,024,323. In general, such polymer/filler compositions are friable materials and tend to exhibit electrical resistance which does not permit the formation of a highly efficient, high energy battery system.

Polycarbonates are a known class of material having a high mechanical strength. These materials have been used in a wide variety of applications including electronics such as covers for time switches, batteries and relay devices as well as moldings for computers, contact strips and other devices. High molecular weight polycarbonates are used in the manufacture of capacitors. The majority of such applications utilize the polycarbonate as an engineering plastic to make substantially thick formations and do not provide a microporous sheet material suitable for use in a corrosive environment of an acid battery design.

It is highly desired to have a battery separator which is capable of exhibiting very low electrical resistance while at the same time providing the combination of properties described above.

SUMMARY OF THE INVENTION

The present invention is directed to a microporous sheet product, battery separators formed therefrom and to improved batteries which incorporate the thus formed battery separator. The subject separator comprises a microporous sheet product composed of a polycarbonate polymer substantially uniformly mixed with a filler and/or with a polycarboxylic acid polymer salt or a polysulfonic acid polymer salt and which has a porous sheet embedded therein and which has a pore structure distribution throughout the thickness such that the nominal pore size of pores increases incrementally from each major surface to the interior, central section of the sheet product.

DETAILED DESCRIPTION

The present invention provides a flexible sheet material having high void volume, porosity of a microporous nature and a configuration which substantially inhibits dendrite formation. The subject sheet product has high tensile strength and ductility sufficient to withstand handling during battery formation, is capable of being formed into desired shapes for use in a battery, is capable of exhibiting a high degree of stability to battery environment over sustained periods of time and of allowing a high degree of electrical conductivity (very low electrical resistance). Still further, the subject sheet material has been found to possess the ability to maintain its integrity and performance characteristics while being able to be formed into a pocket design separator (i.e. not crack or produce voids when being folded on itself and/or manipulated into this preferred design).

The sheet product of the present invention should be in the form of a very thin sheet of less than 50 mils, and preferably less than 10 mils in thickness. The thin sheet is bound by two major surfaces with a thickness therebetween. The body making up the thickness is composed of a substantially uniform composition formed from a polycarbonate and particulate filler and/or with a polycarboxylic acid or polysulfonic acid polymer salt, each of which is fully described hereinbelow. The body, in addition, contains therein a sheet extending the length and breadth of the present sheet product and substantially contained between the present sheet products two major surfaces.

For purposes of clarity, certain terms used in the present description and in the appended claims have the following meanings:

A "sheet" is intended to define a unitary article having a large surface and is used herein to refer to a scrim, or woven, non-woven or knit material used as a component of the subject separator.

A "battery" refers to a single electrochemical cell or, alternately, a multiple of electrochemical cells which are designed to operate in coordination with each other.

A "separator" is a component of a battery which provides a means of separation between adjacent electrode plates or members of opposite polarity. The separator of the present invention may have various configurations, such as a flat or ribbed material in the form of a membrane or envelope design capable of maintaining separation between electrodes.

A "sheet product" is intended to define a composite product of the present invention which is microporous, has pore size distribution across its thickness such that there is a gradient of nominal pore size which increases from each major surface of the sheet product towards its interior central portion without the major change occurring at the region adjacent to each surface, has a porous support sheet substantially contained within the sheet product's thickness and has a form of a polymer-filled composite or a polycarbonate/(structure enhancing agent) composite (with or without filler). The sheet product can be used to form separators suitable as a battery component.

A "polycarbonate" is intended to define a polymeric material having a combination of aryl groups and ether groups and carbonyl groups in the polymer chain and which may also contain alkylene groups therein.

The term "polycarboxylic acid polymer salt" is intended to define a hydrocarbon polymer having a multiplicity of aliphatic carboxylic acid units pendent from the polymer chain with at least a portion of said acid units in the form of a salt.

The term "polyacrylic acid polymer salt" is intended to define a polycarboxylic acid polymer salt having a multiplicity of unsaturated aliphatic carboxylic acid units of the general formula $C_nH_{2n-2}O_2$ such as acrylic acid ($C_2H_3COOH$), crotonic acid, vinyl acetic acid as well as ($C_1$–$C_3$ alk)acrylic acid such as methacrylic acid and the like and copolymers of said acids or with other non-acid comonomer, such as acrylonitrile, alkylenes, acrylic acid esters, alkacrylic acid esters, polyalkenyl ethers and the like. At least a portion of the acid groups are in salt form.

The term "polysulfonic acid polymer salt" is intended to define a hydrocarbon polymer having a plurality of aliphatic or aromatic sulfonic acid or sulfonyl chloride units pendent from the polymer chain and at least a portion of the acid groups are in salt form.

The polymer used to form the body of the sheet should be a polycarbonate. The polycarbonate based battery separator of the present invention has been found suitable for use in acid battery designs. The present invention is directed to a unique microporous sheet product capable of exhibiting the combination of properties described hereinabove as being needed to form a desired battery separator.

The polycarbonates found useful in providing the sheet product and resultant battery separator of the present invention are polyaryl ether carbonates. These polymers can be viewed as having recurring units which is shown below:

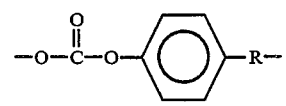

where the carbonate group is in the ortho meta or para position on the benzylic ring and where R represents an aryl, alkaryl, arylalkaryl, oxyaryl, sulfoaryl, mixtures thereof as well as multiple units thereof. For example, the aryl group can be 1,2-phenylene, 1,3-phenylene, 1,4phenylene, 1,4-diphenylene, 1,3'diphenylene and the like; alkaryl and aryl alkaryl groups can be

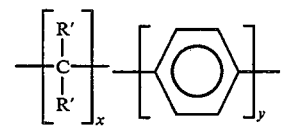

wherein each R' is independently selected from hydrogen or a $C_1$–$C_3$ alkyl group, x and y are each independently selected from integers of 1 to 3 (preferably x and y are each 1 and R' are each methyl). The oxyaryl group and sulfoaryl group are each represented by

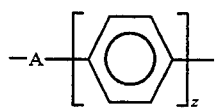

wherein Z is an integer of 1 or 2 and A represents an oxygen atom or sulfur atom bonded in the ortho, meta or para position. A preferred material is a product of bisphenol A [2,2-bis(4-hydroxyphenyl) propane]and phosgene.

The above polycarbonates may contain within the polymer chain one or more than one type of R group, as described hereinabove. For example, the polycarbonate can contain a combination of carbonate groups with aryl groups only or with aryl and alkaryl groups, or with aryl and oxyaryl groups or with aryl and sulfaryl groups, as described hereinabove.

The polycarbonates can be formed by known means and the specific units contained within the polymer chain will depend upon the starting materials used. The major processes of forming polycarbonates is by trans-esterification, such as by the reaction of bisphenol A with diphenyl carbonate or by solution phosgenation in the presence of an acid acceptor (i.e. pyridine), such as by the reaction of bisphenol A with phosgene in methylene dichloride or by interfacial phosgenation which utilizes aqueous alkali as the acid acceptor.

The molecular weight (wt. average) of the polycarbonate should be such that the Tg of the polymer is within the range of from about 150° C. to about 300° C. and the polymer exhibits solubility characteristics as described hereinbelow.

The polycarbonate of use in the instant invention can be copolymers (either block or random) of aryl carbonate units, as described above with aryl sulfone, alkaryl sulfones and the like, such as by phosgenation of bis(-4hydroxyphenyl) aryl ether sulfone, sulfone alone or with bisphenol A, 4,4'-dihydroxybenzophenone or the like, as described in Polymer Preprints, Vol. 30, No. 2, Pg. 117-118 and J. Macromol. Sci. Rev., C27(2), Pg. 313 (1987), the teachings of which are incorporated herein by reference. In addition, the polycarbonate can be a copolymer of aryl carbonate units with alkyl siloxane units.

The polycarbonates used herein should have a wt. average molecular weight of from about 20,000 to about 200,000, preferably at least about 20,000 to about 150,000. The polymer Tg should be from about 150° C. to about 300° C. with from about 175° C. to about 250° C. being preferred. The polymer Tg will be dependent upon the structure of the polymer, as described above, and can be determined by one skilled in the art by conventional analytical means.

The subject polycarbonates have benzylic hydrogens which can be independently substituted by non-dissociative groups, such as alkyl (preferably $C_1$-$C_3$ alkyl) or halogen (preferably chlorine) or by a dissociative group, such as sulfonic or carboxylic acid group. Each of the aryl groups may be unsubstituted or substituted with one or more of the groups described above or may be substituted by different groups on a single aryl group or each on different aryl groups. A preferred polycarbonate polymer for acid battery application has sulfonyl or carboxyl groups, either as the free acid or as the salt, as part of its chemical structure. For example, the polycarbonate can be formed by phosgenation using a mixture of bisphenol A and tetrachlorobisphenol A as co-monomers. Sulfonation can be accomplished by contacting polymer with chlorosulfonic acid, sulfur trioxide, sulfur trioxide with Lewis bases, sulfuric acid and oleum as well as by methods disclosed in J. Appl. Polymer Science by A. Noshay et al. in vol. 20 at pp. 1885-1903 (1976).

The exact degree will depend on the particular polycarbonate being substituted and used to form the subject separator as well as the particular functional group being substituted thereon. The particular degree should be sufficient to impart the desired functional property to the polycarbonate (i.e. wetting property via the sulfonylic or carboxylic acid group) and can be readily determined by conventional analysis.

The polycarbonate component of the subject invention can be the sole polymeric component used in producing the subject battery separator or can be used in combination with a minor amount (preferably up to about 40 wt. percent, most preferably up to about 25 wt. percent) of other polymers which are compatible with the polycarbonate (do not phase segregate), are stable (substantially inert from attach and decomposition by the battery components) to the battery environment for which the present separator is intended to be used. Examples of such supplemental polymers include halogenated polyolefins, polyalkacrylic acid or polyacrylic acid and their esters, polyolefins, polysulfones and the like as well as mixtures and copolymers thereof.

It has been found that a tough, yet flexible sheet product can best be formed by having the polymeric component be formed from a composition composed of a mixture of polycarbonate and from 0.5 to 10 weight percent (preferably 1.5 to 7 wt. %) based on the polymeric mixture of a polyacrylic acid or polyalkacrylic acid (e.g., polymethacrylic acid) or alkyl ester thereof (e.g., a $C_1$-$C_3$ ester). The preferred mixture is formed from polysulfones with a polyacrylic acid or a polyalkacrylic acid. Sheet products formed with the above-described mixtures exhibit a combination of toughness and flexibility to provide battery separators which can maintain integrity under the adverse conditions found in operating batteries.

The polymer or blend of polymers, as described hereinabove, should be soluble in a first liquid while being substantially insoluble in a second liquid (including mixtures of minor amounts of first liquid and major amounts of second liquid) and wherein the first and second liquids are miscible to a high degree with one another. The polymer should be soluble in the first liquid in dosages of at least about 5 wt. percent, preferably from about 10 to 30 wt. percent. High solubility within the first liquid is preferred. The first liquid can be a polar organic liquid, such as N-methylpyrrolidone, dimethylformamide, diethylformamide, dimethylacetamide and the like or a halogenated hydrocarbon such as dichloroethane, trichloroethane, tetrachloroethane, trichloropropane and the like. The polar solvents having lower rates of vaporization are preferred as they readily form a solution with the subject polycarbonates and do not evaporate during the preferred mode of forming the subject separator, as described herein below. The second liquid can be chosen from water, or organic liquids which are miscible with the first liquid and incapable of dissolving the polymer. Such liquids include water, methanol, ethanol, ethylene glycol, glycerol, and the like. Water is the preferred second liquid. The second liquid should be used alone or with a minor amount (up to 40%, preferably up to 30%) of first liquid as the total weight of solution. High concentrations should be avoided (most preferred to have very low concentrations of up to about 20%) in providing the subject sheet product.

The filler to be used in forming the polymer/filler/first liquid mixture, described above and the resultant polymer/filler matrix of the sheet product of this invention should be a particulate material having high surface area (BET; such as 20 to 950 $m^2/gm$, preferably at least 100 $m^2/gm$), high porosity (BET; at least about 0.2 cc/gm; preferably at least about 1 cc/gm). The size of the ultimate (non-agglomerated) filler particulate material should be ultra small having an average diameter of from about 0.01 to about 75 microns, preferably from about 0.01 to about 50 microns. The filler should be substantially free of large (greater than 100 microns) diameter particulate material whether as ultimate or agglomerate material. The filler must be inert with respect to the battery environment and must be substantially insoluble with respect to the first and second liquids when used in forming the subject sheet product, as fully described hereinbelow.

The particulate material used as filler component of the subject sheet product can be selected from a variety of materials such as metal oxides as, for example, oxides of silicon, aluminum and barium, minerals as, for example, mica, vermiculite, montmorillonite, kaolite, attapulgite, talc, and diatomaceous earth; synthetic and natural zeolites; silicates as, for example, calcium silicate, aluminum polysilicates, alumina, and silica gels; cellulosic materials as, for example, wood flours, wood fibers, and bark products; and glass particles as, for example microbeads, hollow microspheres, flakes and fibers. Carbonaceous material as, for example, carbon black, acetylene black, coal dust, and graphite may be used in small amounts in combination with the other particulate material. Particulate materials which are inert to a battery system can be mixed to form the total filler content used in the sheet product.

The sheet product of the present invention has a porous sheet contained within the thickness of the sheet product. The sheet can be in the form of a scrim or woven or non-woven fabric or a knit material and can be formed from a continuous or non-continuous fibrous material. The material used to form the fibrous sheet component of the sheet product must be a material which is inert to the battery environment. Although the sheet component is contained in the interior of the sheet product's thickness, it is contacted with electrolyte solution (including cathodic and anodic material in the solution) as the solution passes through and is contained in the separator. Thus, the fibrous material can be, for example, selected from glass, polyolefin, polyester or polyacrylonitrile polymer filaments or mixtures or copolymers formed with other stable monomeric units (i.e. polyacrylonitrile/polyacrylic acid copolymer; polyolefin/polyacrylic acid copolymer) when the sheet product is used to form a battery separator for acid battery utility. The sheet may be planar (that is, have substantially planar major surfaces) or patterned (that is, have patterned elevated and depressed sections on the major surfaces). It is preferable to utilize a planar sheet to assure that the sheet is contained within the body (or thickness) of the sheet product. The sheet is preferably formed from a substantially uniform, thin denier thread (denier of from about 0.02 to 10) to also assure that the sheet is contained within the body of the sheet product. The sheet should, preferably, have a tensile strength of at least 5 p.l.i. The particular thickness of the sheet should be less than about 0.8 (preferably less than about 0.6) of the thickness of the sheet product. The sheet should extend for substantially the full length and breadth of the resultant sheet product.

The sheet product of the present invention can be formed by various means. Generally, the polymer and particulate material are mixed together with the first liquid to provide a substantially uniform polymer/filler/first liquid composition (sometimes referred to as the "dope composition"). The polymer may be present in from about 5–40 (preferably 10–20) wt. percent and the filler may be present in from about 5–30 (preferably 10–20) wt. percent of the total dope composition. In a preferred embodiment, 1 part (by wt.) polymer, 1 part filler and 8 parts first liquid comprising a polar solvent are used to form a dope composition. The amount of polymer and filler used should be such that their ratio is substantially the ratio of polymer/filler required in the resultant sheet product. Normally this is 1:4 to 4:1 and preferably 1:1.5 to 1.5:1. The amount of first liquid used to make the dope composition must be sufficient to provide a composition having a viscosity of about from 100 to about 10,000 cps (Brookfield viscometer, #3 Spindle at 12 rpm) preferably from about 500 to 8000 cps to be sufficiently viscous to have "body" when combined with the sheet, as described hereinbelow. To enhance the viscosity of the dope, one can add an effective amount of a viscosifying agent provided such agent is inert to the battery environment or is soluble in the second liquid and thereby removed along with the first liquid.

Another embodiment of the present invention provides a battery separator having low content (0 up to about 20 weight percent, preferably from 0 up to about 10 weight percent) of particulate filler, as described hereinabove. When low filler content is desired, it has been unexpectedly found that the filler can be removed provided the polymer component is composed of a major portion of a polycarbonate with a minor portion of a structure enhancing agent. When such low-filler content sheet product is formed, the resultant separator is capable of maintaining its high void volume, exhibits very low electrical resistance when in the battery system (in comparison to sheet product void of structure enhancing agent) and exhibits high tensile strength.

The structure enhancing agent useful in the present invention when low-level filler separator is desired should be capable of exhibiting a combination of properties with respect to the particular polycarbonate/first liquid and with respect to the resultant sheet product. Firstly, the agent should be capable of increasing the viscosity of the polycarbonate/first liquid by a factor of at least about 5 fold and preferably at least about 10 fold. Thus, a polycarbonate/first liquid having a viscosity of about 50 cps will have a viscosity of at least about 250 cps, preferably 500 cps (Brookfield, #4, 50 rpm) when the agent is made part of the dope composition. Secondly, the agent should be substantially insoluble in the second liquid or capable of being at least partially retained (such as a polymer alloy) in the sheet product after subjection to second liquid. Thirdly, the agent must be, similar to the polycarbonate, stable with respect to the battery system contemplated for its use. Fourthly, the agent should aid in enhancing the pore volume of the resultant sheet product vis-a-vis sheet products formed from polycarbonate without the agent.

Fifth, the agent should be capable of imparting enhanced (i.e. lower) electrical resistance properties to the resultant separator (compared to sheet product without agent).

The formed separator unexpectedly exhibits the combined properties of high void volume, low electrical resistance, good physical strength and stability over extended periods of time, as required for a superior battery system. The separator is composed of a polymeric component formed of a mixture of a polycarbonate and from about 0.1 to 15 weight percent (preferably about 1.5 to 10 wt. percent) based on the total weight of the polymer component of a structure enhancing agent as, for example, a polycarboxylic acid polymer salt or a polycarbonate acid polymer salt based on the total polymer content. In addition to the polysulfone/agent mixture, the sheet product may contain low-levels of particulate filler as, for example, of from 0 to about 20 weight percent, preferably from about 0 to 10 weight percent. The initially formed dope composition should contain the polycarbonate and the agent (and, where desired, filler) in ratios appropriate to attain the above composition when the first liquid of the dope is removed. The amount of polycarbonate contained in the dope may be from about 5 to 30 (preferably 10–20) weight percent with the agent and, if used, filler being in amounts dictated by the desired composition of the resultant sheet product and by the required dope viscosity, as described below.

The preferred structure enhancing agents for the polycarbonate are polycarboxylic acid polymer salts or polysulfonic acid polymer salts, as described herein below (each referred to herein as "second polymer").

The polycarboxylic acid polymer salt can be formed from any polymeric hydrocarbon having aliphatic carboxylic acid groups pendent from the polymer's backbone chain. The preferred polycarboxylic acid polymers are polyacrylic acids, poly ($C_1$–$C_5$ alk)acrylic acids, copolymers of acrylic acids and alkacrylic acids as well as polymers and copolymers of said materials with other monomeric units such as acrylonitrile, an alkylene (e.g. butadiene, isoprene, ethylene, and the like). Preferred polymers are polyacrylic acid or polymethacrylic acid homopolymers or those which have only small amounts (e.g. less than 10%) of copolymer units. The most preferred polymers are acrylic acid polymers of high molecular weight which are crosslinked with a polyalkenylpolyether. (Sold under the trademark "Carbopol").

The polysulfonic acid polymer salts can be selected from any polymeric hydrocarbon having aliphatic free sulfonic acid groups or aliphatic sulfonyl chloride groups pendent from the polymer's backbone chain. Such polymers include for example, polyvinylsulfonic acid, polychlorovinyl sulfonyl chloride (sold under the trademark "Hypalon") and the like.

The polymer acids used to form the salts should be of a high weight average molecular weight of at least about 250,000. It is preferred that the polymer be of a molecular weight of from about 400,000 to about 5,000,000 and most preferably of from about 1,000,000 to 5,000,000. These polymers (as the salt) should be miscible with and swelling in the first liquid while being substantially insoluble or at least retainable therein as a polymer alloy with the polycarbonate in the second liquid used in forming the subject separator. The particular liquids and polycarbonate used in forming the separator will dictate the composition of the agent or second polymer to be used. The solubility characteristics of the second polymer can be readily determined by one skilled in the art by conventional techniques. The agent to be used for swelling and viscosity increase is determined by matching solubility, hydrogen bonding and dipole moment of the first liquid and polymer blend.

The second polymer should be at least partially neutralized by forming a salt of the carboxylic acid or sulfonic acid units. Such neutralization may be attained with from about 0.1 to 1.01, preferably from about 0.25 to 1 molar ratio of a base, such as an alkali or alkaline earth metal oxide or hydroxide when the resultant separator is contemplated for use in an alkaline battery system. In the case of acid battery separators, it has been unexpectedly found that a base in the form of organic amines, in particular secondary and tertiary amines, can be used to form the polymer salt to be included in the battery separator product and that such product is stable in and not detrimental to the battery environment. The amine can be selected from dialkyl and trialkyl amines wherein each alkyl is independently selected from a $C_2$ to $C_{20}$ alkyl group or a $C_2$–$C_{10}$ hydroxyalkyl group (preferably a higher alkyl such as a $C_6$–$C_{20}$ alkyl or a $C_3$–$C_8$ hydroxyalkyl) such as diamylamine, triamylamine, triisopropylamine, diisopropanolamine, dihexylamine, di(2-ethylhexyl) amine. For example, a polycarbonate dope formed with dimethylformamide, N-methylpyrrolidone, diethylene glycol or dimethyl sulfoxide as the first liquid may contain a high molecular weight polyacrylic acid which is at least partially neutralized with diisopropanolamine, triethylamine, di(2-ethylhexyl)amine (preferred) and the like to provide a high viscosity dope.

The resultant dope should have a viscosity of from about 100 to 10,000 cps (Brookfield, #3 spindle, 12 rpm) preferably from about 500 to 8,000 cps to be sufficiently viscous to have "body" when combined with the sheet, as described below.

The polymer/filler/first liquid or polymer/agent-/first liquid composition can be impregnated into the sheet in any manner which causes the composition to be uniformly distributed throughout the thickness of the sheet and to extend on each side thereof to form a coating of dope composition on each surface of the sheet. This can be done by various techniques such as dipping, coating, and the like. Whatever manner is used, the dope composition must be contained free of gas bubbles or voids throughout the sheet and on each of the sheet's surfaces. It is preferable to impregnate and coat the sheet by applying the dope composition onto one major surface of the sheet and forcing it through the sheet while maintaining the other major surface substantially free. As the dope penetrates through the sheet in this manner, the air in the sheet's voids is forced to exit via the free surface and the free surface subsequently attains saturation and a coating of the composition. The dope may be applied in more than one application, such as by first applying a low viscosity (e.g. 400 to 1000 cps with #4 spindle at 50 rpm) dope and subsequently applying to at least one surface a higher viscosity dope. The impregnated porous sheet should be free of air voids and bubbles.

The impregnated sheet is then contacted with the second liquid, as described above, to coagulate and solidify the polymeric component with its filler, where appropriate, while simultaneously removing the first liquid from the fibrous sheet composite. The second liquid should contact both surfaces of the previously impregnated sheet in a manner which provides for substantially equal and concurrent rates of removal of the first liquid from the sheet. The mixed liquid should be removed and replaced with fresh second liquid to retain low concentrations of first liquid in the contact bath. In this manner it has been found that the average pore size (diameter) of the pores at each major surface is substantially equal and less than that of the pores located in the internal section of the resultant sheet product.

It has been found that the formed sheet product of the present invention has porosity composed of pores such that there is a gradient of nominal pore size increasing from each major surface of the sheet product towards the interior, central portion of its thickness. Generally, the pores exhibit a progressive and substantially continuous increase in pore diameter from each major surface towards the central section without having a major change occur at any one increment of the thickness including the region adjacent each major surface. In addition, the sheet product of the present invention preferably has a substantially uniform void volume profile across its thickness.

Although it is common practice to form membranes with the aid of a support member, it is preferred herein that the support sheet should be impregnated with the polymer/filler/first liquid dope composition by applying the dope onto one major surface of the support sheet and forcing it through the sheet while maintaining the other major surface free. As stated above, a second application of dope composition (preferably of higher viscosity) may be applied to one or both surfaces. This mode of application is preferred when applying a low filler content dope composition. The impregnated sheet may then be processed through a means for regulating its thickness such as by using doctor blades or the like and subsequently immersed into a bath of second liquid in a manner which substantially simultaneously contacts each of the major surfaces of the impregnated sheet to the second liquid. The second liquid should not be allowed to accumulate high concentrations of first liquid therein. All of these steps are done without the aid of a support member, as is common practice. After the impregnated sheet has been contacted with the second liquid to cause the polymer/filler to set, the resultant sheet product may be brought into contact with directional ollers and the like. The resultant sheet product should be washed with fresh amounts of second liquid to cause removal of the first liquid material. For example, when the first liquid is selected from a polar solvent such as N-methyl pyrrolidone, the amine solvent should be substantially completely removed.

The resultant sheet product is a microporous sheet of very high porosity (porosity of 50 vol. percent and even up to 80 vol. percent). The sheet product has a length and breadth and a predetermined thickness which should be less than about 50 mils, preferably less than about 10 mils. Very thin, flexible sheet products having good mechanical properties of tensile strength and modulus of elasticity have been unexpectedly formed. It is well known that polycarbonates sheet materials have very poor mechanical properties and that the inclusion of high levels of particulate filler into the polymer matrix would presumably further cause the sheet product to have increased brittle characteristics while the high porosity would be presumed to cause a sheet product of very low tensile strength and poor integrity. Instead, it has been unexpectedly found that the sheet product of this invention provides all of the desired properties for a battery separator including strength, flexibility, very low electrical resistance, good integrity, etc.

The resultant sheet product is a material where the porosity is composed of pores such that there is a gradient of average pore size from each major surface toward the interior, central portion of the sheet product's thickness. The average pore size in the region adjacent to each major surface is normally less than about 3 microns, preferably less than about 2 microns and most preferably less than about 1 micron. The interior region of the sheet product contains pores having an average pore size greater than that of the surface region (normally at least about 1.5 times). The overall average pore size may range from 0.01 to about 10 microns. These measurements can be made by scanning electron microscopy and analysis thereof and may be confirmed by mercury intrusion methods.

The resultant sheet product is composed of a polysulfone matrix of substantially a uniform composition. In the case of the highly filled embodiment the filler is substantially uniformly dispersed in the polymer and the polymer/filler weight ratio is from 4:1 to 1:4 and, preferably from 1:1.5 to 1.5:1. In the low-level filler sheet product will have a polymer matrix composition composed of from 2 to 30 (4 to 20 preferred) parts by wt. polysulfone; from about 0.1–5 (0.6 to 2 preferred) parts by weight agent or second polymer; and from 0 to 5 (0–2 preferred) parts by wt. filler. Further, when the sheet product is formed by a dual application, as described above and the second application is applied to one side only, the sheet may be assymetrically contained within the sheet product's thickness and a minor portion of the sheet's fleece may extend to the surface or beyond. This provides a highly effective anchor means to attach subsequently applied rib material to that surface of the sheet product (commonly used in acid batteries).

The sheet product may contain additional components such as viscosifer, surfactants, antioxidants, colorants and the like. Such materials can be incorporated in the sheet product by having them made part of the polymer/filler/first liquid composition, as one of the final washes of the second liquid or separately applied by spraying and the like.

The sheet product is a flexible material capable of being folded upon itself and formed into an envelope design. The initially formed sheet product may have a wrinkled configuration (especially when subjected to a free standing coagulation process). These wrinkles are readily removed by subjecting the sheet product to a heated roller or rollers while maintaining the sheet product under tension. The temperature of the heated rollers should be below the glass transition temperature of the particular polymer used (preferably at least about 25° C. below).

The sheet product can be cut into suitable shape to be used as a separator between electrodes of a battery design. The separator must extend the full length and width of the electrode to prevent electrodes of opposite polarity from contacting one another. In certain instances, it is preferred that the separator be void of patterns or other raised sections (generally for alkaline batteries) or may contain raised portions, such as ribs, buttons and the like (generally for acid batteries). The ribs or other raised portions can be formed from any polymeric material capable of adhering to the polymer used to form the base sheet product.

The following examples are given for illustrative purposes only and are not meant to be a limitation on the subject invention, as defined by the appended claims. All parts and percentages are by weight unless otherwise indicated. The electrical resistance of 0.94 ohm-cm. was determined by the direct current method as described by J. J. Lander and R. D. Weaver in Characteristics of Separators for Alkaline Silver Oxide-Zinc Secondary Batteries: Screening Methods, ed. by J. Cooper and A. Fleischer, Chapter 6 modified by using 35% $H_2SO_4$ as the electrolyte, $Hg/Hg_2SO_4$ type reference electrodes, and Pt screens as the current carrying electrodes. The voltage drop across the reference electrodes was measured at 20 ma.

EXAMPLE I

A solution was prepared by mixing 4.7 parts of a polycarbonate (MW=30,000) formed from Bisphenol-A and phosgene (Lexan 181), 4.7 parts precipitated silica (Davison, Sylox-2 average part. size=10 microns), 0.06 part 2,2-diethyldihexylamine, 0.15 part polyacrylic acid and 48.9 parts N-methylpyrrolidone using a high shear mixer (Myers). The solution had a viscosity of $7.15 \times 10^3$ cps (Brookfield viscometer with #3 spindle).

A 0.5 oz/yd$^2$ nonwoven polyesterfabric (denier=2.2) was saturated with the solution by passing the fabric over one roller of a pair of reverse kiss rollers to which the solution was introduced. The solution was thus forced through the fabric with removal of air and resulted in a saturated material having excess solution on both major surfaces. The saturated fabric was then caused to travel in s substantially vertical direction while passing through a set of gapping bars to provide a saturated material of about 7 mils thick. The material then entered a first aqueous bath and remained therein for about 30 seconds to allow solidification of the polymer and extraction of a portion of the organics. The material was then subjected to a series of aqueous baths composed of fresh D.I. water at 50° C. for further removal of organics. The formed material was air dried at 60° C. for 3 min. The material was analyzed for residual organic (NMP) by dissolving a sample in THF and analyzing using gas phase chromatography and was found to contain less than 1 wt. percent NMP based on the dried weight of the formed material. The morphology was analyzed using scanning electron microscopy (SEM) and showed that the pores at the surface region of the formed sheet were less than 0.3 microns in diameter which increased towards the center of the material's thickness to about 5 microns with some smaller pores in the range of 2 to 5 microns in diameter. The total void volume was determined by difference between the weight of dried sample and after saturation with isopropanol and was found to be 77%. The electrical resistance was 0.94 ohm-cm.

EXAMPLE II

A separator product was formed in the same manner as described in Example I above except that the polymer/filler solution was formed from 48 parts polycarbonate, 48 parts precipitated silica, 0.5 part DEDHA, 1.5 parts polyacrylic acid and 504 parts N-methylpyrrolidone (NMP). The solution had a viscosity of $8.35 \times 10^3$ cps. The nonwoven web was heavier (0.6 oz/sq.yd.). The formed separator exhibited a total void volume of 78 percent, a morphology of very small pores at the surface with gradually larger pores internally and the web was internal in the separator product. The separator showed an ER of 0.8 ohm-cm.

EXAMPLE III

A solution was prepared by mixing 48 parts of polycarbonate (Calibre 300-10, $MW_w$=30,000) with 400 parts of N-methyl pyrrolidone (NMP) using a high shear mixer. 1.5 parts of polyacrylic acid (Carbopol 940; $MW_w$=4,000,000) and 0.6 parts di(2-ethylhexylamine) in 102 parts of NMP were added to the polycarbonate solution. The solution was thoroughly mixed and had a viscosity of $230 \times 10$ cps (Brookfield #3 at 12 rpm).

A 0.75 oz/yd$^2$ non woven polyester fabric (Reemay) was saturated with the polycarbonate solution by passing the fabric through the solution (which had been filtered and deaerated) and a knife blade to regulate the dope/fabric thickness. The saturated fabric was then caused to travel in a substantially vertical direction into an aqueous bath remaining therein for about 30 seconds. The sheet product was then washed in a series of aqueous solutions to remove NMP and then air dried at 60° for 5 minutes. The sheet product was cut into samples. The pore morphology was analyzed for SEM and was found to be similar to the sheet of Example I above. The sheet thickness was approximately 5.4 mils, had an electrical resistivity of 1.1 ohm-cm after a 4 hour soak in $H_2SO_4$ and a porosity of about 79%.

What is claimed:

1. A battery separator comprising a microporous sheet product having a thickness of less than about 50 mils bound by first and second surfaces of the sheet product, comprising a mixture of from 1:4 to 4:1 wt. ratio of a thermoplastic polycarbonate and a particulate filler with a porous sheet embedded between the first and second surfaces of the sheet product and having porosity throughout the sheet product's thickness with a pore size distribution such that the pore size increases from each major surface towards an interior, central portion of the sheet product's thickness.

2. The battery separator of claim 1 wherein the pore size distribution is continuous in increase of pore size from each surface to the interior, central portion of the sheet product's thickness.

3. The battery separator of claim 1 wherein the average pore size of the sheet product is less than about 10 microns, the pore size of the pores in the immediate proximity to each of the first and second surfaces is equal and less than about 3 microns and the pore size distribution is equal and less than about 3 microns and the pore size distribution is continuous in increase of pore size from each surface to the interior, central portion of the sheet product's thickness.

4. The battery separator of claim 1 wherein the filler is selected from an inert inorganic particulate, said particulate having a surface area of from about 20 to 950 m$^2$gm, a pore volume of at least 0.2 cc/gm, an average particle size of from about 0.01 to 75 microns and is free of particles having particle size larger than 100 microns.

5. The battery separator of claim 1, 2, 3 or 4 wherein the polycarbonate comprises a homopolymer, copolymer or mixture of said polymers having recurring units of the formula:

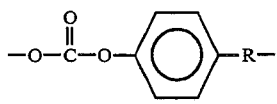

wherein the R represents an aryl, alkaryl, arylakaryl, oxyaryl and sulfoaryl or mixtures thereof.

6. The battery separator of claim 4 wherein the particulate filler is selected from the group consisting of oxides and hydroxides of calcium, magnesium titanium, aluminum and mixtures thereof.

7. A battery separator comprising a microporous sheet product having a thickness of less than about 50 mils bound by first and second surfaces of the sheet comprising a mixture of a thermoplastic polycarbonate and from about 0.1 to 15 wt. percent based on the polycarbonate of a structure enhancing agent with a porous sheet embedded between the first and second surfaces of the sheet product, and having porosity throughout the sheet product's thickness with a pore size distribution such that the pore size increases from each surface towards an interior, central portion of the sheet product's thickness without a major portion of said increase occurring in regions adjacent to each surface.

8. The battery separator of claim 7 wherein the support sheet within the sheet product thickness is positioned adjacent one of the surfaces.

9. The battery separator of claim 7 or 8 wherein the agent is selected from the group consisting of a polycarboxylic acid polymer salt and a polysulfonic acid polymer salt formed with 0.1 to 1.01 molar equivalent of base selected from alkali metal, alkaline earth metal, a secondary amine and a tertiriary amine.

10. The battery separator of claim 7 wherein the sheet product has a polymer matrix composed of from about 65 to 99.9 weight percent of a polycarbonate, from about 0.1 to 15 weight percent of a strength enhancing agent and from 0 to about 20 weight percent of an inert particulate filler.

11. A battery separator of claim 10 wherein the particulate filler is selected from the group consisting of oxides and hydroxides of calcium, magnesium, titanium, and aluminium mixtures thereof.

12. In a battery having at least one pair of electrodes of opposite polarity, an electrolytic composition and a separator positioned between adjacent electrodes of opposite polarity, wherein the improvement comprises that the separator extends at least the length and breadth of the electrodes and comprises the product of claim 1, 2, 3, 4, 6, 7, 8, 10 or 11.

13. In a battery having at least one pair of electrodes of opposite polarity, an electrolytic composition and a separator positioned between adjacent electrodes of opposite polarity, wherein the improvement comprises that the separator extends at least the length and breadth of the electrodes and comprises the product of claim 5.

14. In a battery having at least one pair of electrodes of opposite polarity, an electrolytic composition and a separator positioned between adjacent electrodes of opposite polarity, wherein the improvement comprises that the separator extends at least the length and breadth of the electrodes and comprises the product of claim 9.

15. A battery separator of claim 4 or 10 wherein the particulate is selected from oxides of silicon.

16. In a battery having at least one pair of electrodes of opposite polarity, an electrolytic composition and a separator positioned between adjacent electrodes of opposite polarity, wherein the improvement comprises that the separator extends at least the length and breadth of the electrodes and comprises the product of claim 15.

* * * * *